(12) United States Patent
Hostetler

(10) Patent No.: US 8,076,791 B2
(45) Date of Patent: Dec. 13, 2011

(54) WIND AND WATER TURBINE

(76) Inventor: Lester Hostetler, Kansas City, MO (US)

( * ) Notice: Subject to any disclaimer, the term of this patent is extended or adjusted under 35 U.S.C. 154(b) by 654 days.

(21) Appl. No.: 12/206,623

(22) Filed: Sep. 8, 2008

(65) Prior Publication Data
US 2010/0060008 A1 Mar. 11, 2010

(51) Int. Cl.
*F03B 13/00* (2006.01)
(52) U.S. Cl. .......................................... 290/54; 290/55
(58) Field of Classification Search .............. 290/54, 290/55; 415/3.1, 4.1, 905; 416/132 R, 174; F03B 7/00, 13/00, 13/06, 13/12, 13/16, 13/22, F03B 13/24, 13/261, 15/06, 17/06; F03D 7/00
See application file for complete search history.

(56) References Cited

U.S. PATENT DOCUMENTS

| | | | |
|---|---|---|---|
| 4,517 A | 5/1846 | Hand | |
| 302,769 A | 7/1884 | Pallausch | |
| 391,539 A | 10/1888 | Lard | |
| 1,293,262 A * | 2/1919 | Walker | 416/101 |
| 2,379,324 A | 6/1945 | Topalov | |
| 3,974,396 A * | 8/1976 | Schonball | 290/54 |
| 4,004,861 A | 1/1977 | Soules | |
| 4,095,422 A * | 6/1978 | Kurakake | 60/398 |
| 4,303,835 A * | 12/1981 | Bair | 290/55 |
| 4,380,417 A | 4/1983 | Fork | |
| 4,411,591 A | 10/1983 | Hesting | |
| 4,496,283 A * | 1/1985 | Kodric | 416/44 |
| 4,737,070 A * | 4/1988 | Horiuchi et al. | 415/7 |
| 4,776,762 A | 10/1988 | Blowers, Sr. | |
| 5,051,059 A | 9/1991 | Rademacher | |
| 5,808,369 A * | 9/1998 | Whelan | 290/55 |
| 6,006,518 A | 12/1999 | Geary | |
| 6,365,984 B1 * | 4/2002 | Shu | 290/53 |
| 6,499,939 B2 | 12/2002 | Downing | |
| 6,537,018 B2 * | 3/2003 | Streetman | 415/3.1 |
| 6,629,815 B2 * | 10/2003 | Lusk | 415/4.2 |
| 7,075,191 B2 * | 7/2006 | Davison | 290/54 |
| 7,090,553 B1 | 8/2006 | Seiford, Sr. | |
| 7,385,302 B2 * | 6/2008 | Jonsson | 290/54 |
| 2009/0110554 A1 * | 4/2009 | Dukovic et al. | 416/41 |
| 2009/0289459 A1 * | 11/2009 | Chung | 290/55 |

FOREIGN PATENT DOCUMENTS

| | | |
|---|---|---|
| RU | 2016220 | 7/1994 |
| WO | WO2004085841 | 10/2004 |

* cited by examiner

*Primary Examiner* — Quyen Leung
*Assistant Examiner* — Thomas Truong
(74) *Attorney, Agent, or Firm* — Allen, Dyer, Doppelt, Milbrath & Gilchrist, P.A.

(57) ABSTRACT

A power generation system that provides means for a wind or water powered wheel having pairs of radially positioned arms each having a shaft with a pair of fins pivotally attached thereto and where the independently rotating fins or paddles allow for increased power generation and reduced drag.

20 Claims, 12 Drawing Sheets

WIND AND WATER TURBINE

BACKGROUND OF THE INVENTION

1. Field of the Invention

The present invention relates to power generators and more specifically it relates to a wind or water turbine with fins that rotate independently to maximize power generation.

The present invention is a wind or water powered turbine comprising stationary plates having an off-center power shaft with pairs of radially extending arms fastened thereto with bearing supported transverse shafts having fixed fins with roller bearings positioned on each corner of the fin side engaging a stationary plate. Each of the stationary plates has a track with one of the fins roller bearings contained thereby. Also positioned on the interior side of each of the stationary plates is a pivotal switch for re-orienting the fin during its elliptical path along the periphery of the stationary path with the object of having one fin in a vertical position receiving the full force of the wind or water on its vertical face while the fin on the opposite side being in a horizontal position receives a force only on its edge.

The stationary plate channel provides means for encapsulating a lead bearing fixedly attached to each fin allowing the fin to transverse around a centralized pivot point. Upon rotation about the channel the encapsulated lead bearing reaches a transfer pivot switch that forces the lead bearing out of the channel while leading a trailing bearing or (free bearing) fixedly attached to the opposing end of the fin into the channel.

With the transferring of the lead bearing out of the channel and the free bearing into the channel optimal fin position is obtained to provide maximum power to the main shaft and thus improved generation of power. Thus upon each time the lead bearing of the fin reaches the transfer switch, the lead bearing is converted into the free bearing and the free bearing is converted into the lead bearing. Utilizing this system of the present invention in a four fin configuration, 90 degrees apart, upon rotation of each revolution three of the four fins are in constant generation of power while the forth fin is positioned to minimize drag.

2. Description of the Prior Art

There are other wind and water turbines. Typical of these is U.S. Pat. No. 4,517 issued to Hand on May 16, 1846.

Another patent application was issued to Pallausch on Jul. 29, 1884 as U.S. Pat. No. 302,769. Yet another U.S. Pat. No. 391,539 was issued to Lard on Oct. 23, 1888 and still yet another was issued on Jun. 26, 1945 to Topalov as U.S. Pat. No. 2,379,324. Another patent was issued to Soules on Jan. 25, 1977 as U.S. Pat. No. 4,004,861.

Yet another U.S. Pat. No. 4,380,417 was issued to Fork on Apr. 19, 1983. Another U.S. Pat. No. 4,411,591 was issued to Hesting on Oct. 25, 1983 and still yet another was issued on Oct. 11, 1988 to Blowers as U.S. Pat. No. 4,776,762. Another patent was issued to Rademacher on Sep. 24, 1991 as U.S. Pat. No. 5,051,059 and still yet another was issued on Dec. 28, 1999 to Geary as U.S. Pat. No. 6,006,518.

Another patent application was issued to Downing on Dec. 31, 2002 as U.S. Pat. No. 6,499,939. Yet another U.S. Pat. No. 7,090,553 was issued to Seiford on Aug. 15, 2006.

Internationally, a Russian patent was issued to Bojarshinov as Russian Patent No. RU2016220 on Jul. 15, 1994. An International Patent Application was published to Castaneda Mungi on Oct. 7, 2004 as World Publication No. WO2004/085841.

U.S. Pat. No. 4,517

Inventor: Christopher Hand

Issued: May 16, 1846

This is a new and useful improvement in water-wheels, and that the following is a full, clear, and exact description of the principle or character thereof, which distinguishes it from all other things before known, and of the manner of making, constructing, and using the same, reference being had to the accompanying drawings, making part of this specification.

U.S. Pat. No. 302,769

Inventor: Franz Pallausch

Issued: Jul. 29, 1884

This invention has reference to an improved paddle-wheel which may be used either as a water-wheel, or as a wind-motor, or as a ventilator, and which may be mounted either horizontally or vertically and worked at any level of the water and in a state of total submersion.

U.S. Pat. No. 391,539

Inventor: Shelden B. Lard

Issued: Oct. 23, 1888

The invention consists of a water wheel provided with a series of overlapping leaves or buckets pivoted a little at one side of their center, and with a series of loosely pivoted and sliding catches for engaging the leaves or buckets when folded, to lock them closed. The invention also consists in the peculiar construction and arrangement of parts, all as hereinafter fully described, and pointed out in the claims.

U.S. Pat. No. 2,379,324

Inventor: Michael S. Topalov

Issued: Jun. 26, 1945

This invention relates either to water or to wind power motors which are composed of two or more rotors turning about vertical axes in opposite directions, and is a modification of the stream motors disclosed in my previous application Ser. No. 316,149 filed in the U.S. Patent Office Jan. 29, 1940, Division 9, room 4624. It is an object of my invention to provide a simple and efficient rudderless motor to utilize either the wind or the natural flow of water without the aid of dams or the like.

U.S. Pat. No. 4,004,861

Inventor: Charl Soules

Issued: Jan. 25, 1977

A wind driven prime mover which is driven by a plurality of arcuately shaped wind vanes pivotally mounted on a rotatable turntable. The wind vanes are pivotally mounted on the turntable with their pivot axle disposed in a vertical plane. The pivots are positioned adjacent the periphery of the turntable, with the pivots being spaced equidistant from each other and equidistant from the axis of rotation of the turntable. The bottoms of the vanes are arcuately shaped, with the length of the arc being slightly longer than the space between the pivots so that there is an overlap between adjacent vanes. The convex surface of the vanes face outwardly to provide a concave inner surface.

U.S. Pat. No. 4,380,417

Inventor: Werner Fork

Issued: Apr. 19, 1983

An installation for extracting useful work, such as driving an electric generator from a fluid stream, includes a platform rotatable about a central axis and supporting a plurality of blades or vanes, each of which is rotatable about its individual blade axis to vary the angle of attack between the blades and the fluid stream during each revolution of the platform. The blades are coupled together so that each blade executes a similar motion during each platform revolution and so that the angle of attack of the fluid stream relative to a given blade is substantially zero when the fluid stream direction is perpendicular to the plane including the central platform axis and the axis of the given blade, the amount of variation in blade angle of attack during each revolution is variable to compensate for variations in the fluid flow.

U.S. Pat. No. 4,411,591

Inventor: Daniel O. Hesting

Issued: Oct. 25, 1983

A power turbine employs a plurality of turbine blades each having a normal lip mounted at the free ends thereof. The plurality of turbine blades are mounted in a paddle wheel type configuration about the turbine power shaft. The paddle wheel blade configuration is interposed between the pressurized fluid inlet and outlet ports for efficient response to the pressurized fluid moving therebetween. Directional fans mounted about the rotating shaft maintain the fluid flow through the turbine so as to assure an optimum power as offered by the rotating turbine shaft. A home power generation system utilizing the turbine is also disclosed herein.

U.S. Pat. No. 4,776,762

Inventor: Leo W. Blowers

Issued: Oct. 11, 1988

A power conversion turbine for actuation by fluid in motion such as, for example, the wind, with a body supported to rotate about a central axis and carrying a plurality of vanes spaced from said axis and being movable about respective vane axes parallel to said central axis and which vanes are circumferentially spaced from each other and dimensioned such that, when said vanes are in a first closed position they collectively form a substantially unbroken cylindrical surface and are selectively movable from said first position to a fully open second position and said vanes including interconnecting means causing selected ones of said vanes to close as one or more opposing vanes are caused to move from the first to the second position by reason of passage of fluid and means integrally connected with said interconnecting means for infinitely varying the degree of opening of the vanes between fully closed and fully open positions. An auxiliary strip may be provided along the full length of the inner surface of each vane near the leading edge to facilitate and accelerate the initial opening movement of the vanes.

U.S. Pat. No. 5,051,059

Inventor: T. Peter Rademacher

Issued: Sep. 24, 1991

A hinged vane rotor generating power from rivers, streams, tides or wind. A cylindrical drum is supported sideways in a current by axles at the ends connected to pulleys which are in turn, connected to a generator(s), mill wheel, pump or other working device. The rotor is turned by a series of hinged vanes, each one opening to catch the current on one side of the drum and closing to avoid the current on the other side of the drum. A fluid directing component is incorporated to increase current against one side of the drum and reduce it against the other side.

U.S. Pat. No. 6,006,518

Inventor: Jeffrey B. Geary

Issued: Dec. 28, 1999

An ocean current energy converter is disclosed which, by positioning upon an ocean floor, harnesses and converts energy stemming from wave, tide, and current propagation into useful electrical power. The ocean current energy converter comprises a pair of support legs which are secured to a rotating canister which comprises a plurality of fins disposed about an outer periphery of said rotating canister. Wave motion acting upon the fins of the rotating canister causes said canister to rotate, thus driving a power generating source contained therein, and producing electrical energy.

U.S. Pat. No. 6,499,939

Inventor: Eric E. Downing

Issued: Dec. 31, 2002

The present invention 10 discloses a wheel-like member 30 consisting of a central circular body member 18 having a plurality of spokes 22 radiating from its outside perimeter that attach to the inside perimeter of an outer circular body member 24. On the outside perimeter of the outer circular body member a plurality of hinges 26 with paddles 16 are attached thereto that can only open to a pre-determined angle "A" from the wheel 30 that ensures water current 14 is caught by the paddles on only one side of the wheel which causes the wheel to rotate in only one direction. The kinetic energy stored in the wheel 30 while rotating is harnessed through a drive shaft 34 connected to the central circular body member 18 that connects to a generator 36 placed perpendicular to the central circular body member 18. To keep the generator 36 and drive shaft 34 in place a plurality of support members 40, with cross-member support couplers 48 are disposed into the bed 42 of the river or ocean that the device 10 is being used in.

U.S. Pat. No. 7,090,553

Inventor: Donald S. Seiford, Sr.

Issued: Aug. 15, 2006

A paddle wheel propulsion system includes a paddle wheel mounted for rotation about its horizontal axis for propelling a vessel, and for unlimited rotation about a vertical axis perpendicular to its horizontal axis for steering the vessel. The paddle wheel is also supported for limited vertical movement relative to the vessel. Reversible power drive is provided for independently controlling movement of the paddle wheel about its vertical and horizontal axes and for elevating and lowering the paddle wheel. Improved paddles are concave on both sides to provide maximum efficiency in both direction of rotation about the horizontal axis.

Russian Patent Number: RU201620

Inventor: Viktor Bojarshinov

Issued: Jul. 15, 1994

A working wheel with blades and their rotary mechanism is mounted on a shaft. The mechanism is made in the form of a system of movable and stationary relative to their axes gears with gear ratio 2/1. Gears movable relative to their axes are mounted on the axes of the blades, the stationary gears on the wheel axle. The movable gears are interconnected around the periphery and connected to the stationary ones along the radius by chain gears.

International Publication Application Number: WO 2004/085841

Inventor: Carlos Aristides Castaneda Mungi

Issued: Oct. 7, 2004

The hydraulic generator consists of a rotor and multiple paddles with synchronized rotation between rotor and paddles, has been conceived with the purpose of being able to obtain the larger percentage of the water energy, taking advantage of the water energy, taking advantage of the horizontal drive of this, which is transmitted by the paddles to the rotor, by a leverage effect through the pinions or sprockets of the rotor. The special design of this invention shows the synchronized rotation between rotor and paddles, which is achieved by means of pinions with chain belts or synchronous pulley with synchronous band in a relation of 1 to 2 in the diameter of the pinions or pulley of the rotor and paddles respectively. This invention is classified within the energy generator of motion to be applied in electrical generators, water pumps, moll and all equipment that with require of an external source of this type.

While these water and wind driven systems may be suitable for the specific individual purposes to which they address, they would not be suitable for the purposes of the present invention.

SUMMARY OF THE PRESENT INVENTION

A primary object of the present invention is to provide a wind or water powered wheel having pairs of radially positioned arms with each having a shaft with a pair of fins pivotally attached thereto. Another object is to provide a wind or water powered wheel whereby the fins are independently movable.

An additional object is to provide a wind or water powered wheel whereby one fin is driven in a vertical plane while the bottom fin is driven in a horizontal plane within a channel.

Yet an additional object is to provide a wind or water powered wheel whereby said channel provides means for encapsulating a lead bearing fixedly attached to each fin allowing the fin to transverse around a centralized pivot point.

Still yet an additional object is to provide a wind or water powered wheel whereby upon rotation about the channel the encapsulated lead bearing reaches a transfer switch that forces the lead bearing out of the channel while leading a trailing bearing or (free bearing) fixedly attached to the opposing end of the fin into the channel.

An additional object is to provide a wind or water powered wheel whereby optimal fin position is obtained to provide maximum power to the main shaft and thus improved generation of power.

A further object is to provide a wind or water powered wheel that is simple and easy to use.

A still further object is to provide wind or water powered wheel that is economical in cost to manufacture and operate.

Additional objects of the present invention will appear as the description proceeds.

The present invention overcomes the shortcomings of the prior art by providing A turbine powered by a moving fluid such as air or water has a pair of oppositely disposed wheels; a main shaft connecting the wheels as an axle, such that each of the wheels has an inboard side and an outboard side; a circular channel in each of the inboard sides of the pair of wheels; a pair of oppositely disposed arms connected at one end, at right angles, to the main shaft; a pivot bearing connected to a distal end of each of the arms; a fin shaft rotatably connected through each pivot bearing with a pair of distal ends disposed on opposite sides of each pivot bearing, the fin shaft generally parallel to the main shaft; a fin rotatably affixed at the middle of one side to each fin shaft distal end, the fin having a distal free side and each fin being independently rotatable; a pair of roller bearings extending from opposing ends of the distal free side of the fins, the roller bearings sized to fit within the circular channels and oriented such that the fins traverse around the pivot bearing and the pair of roller bearings alternately enter and revolve through the circular channels in the wheels, with the roller bearing in the channel being a lead bearing and the roller bearing outside the channel being a free bearing; and a transfer switch in each of the channels which forces the lead bearing out of the channel while urging the free bearing into the channel.

The foregoing and other objectives and advantages will appear from the description to follow. In the description, reference is made to the accompanying drawings, which forms a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings.

DESCRIPTION OF THE REFERENCED NUMERALS

Figure 1:
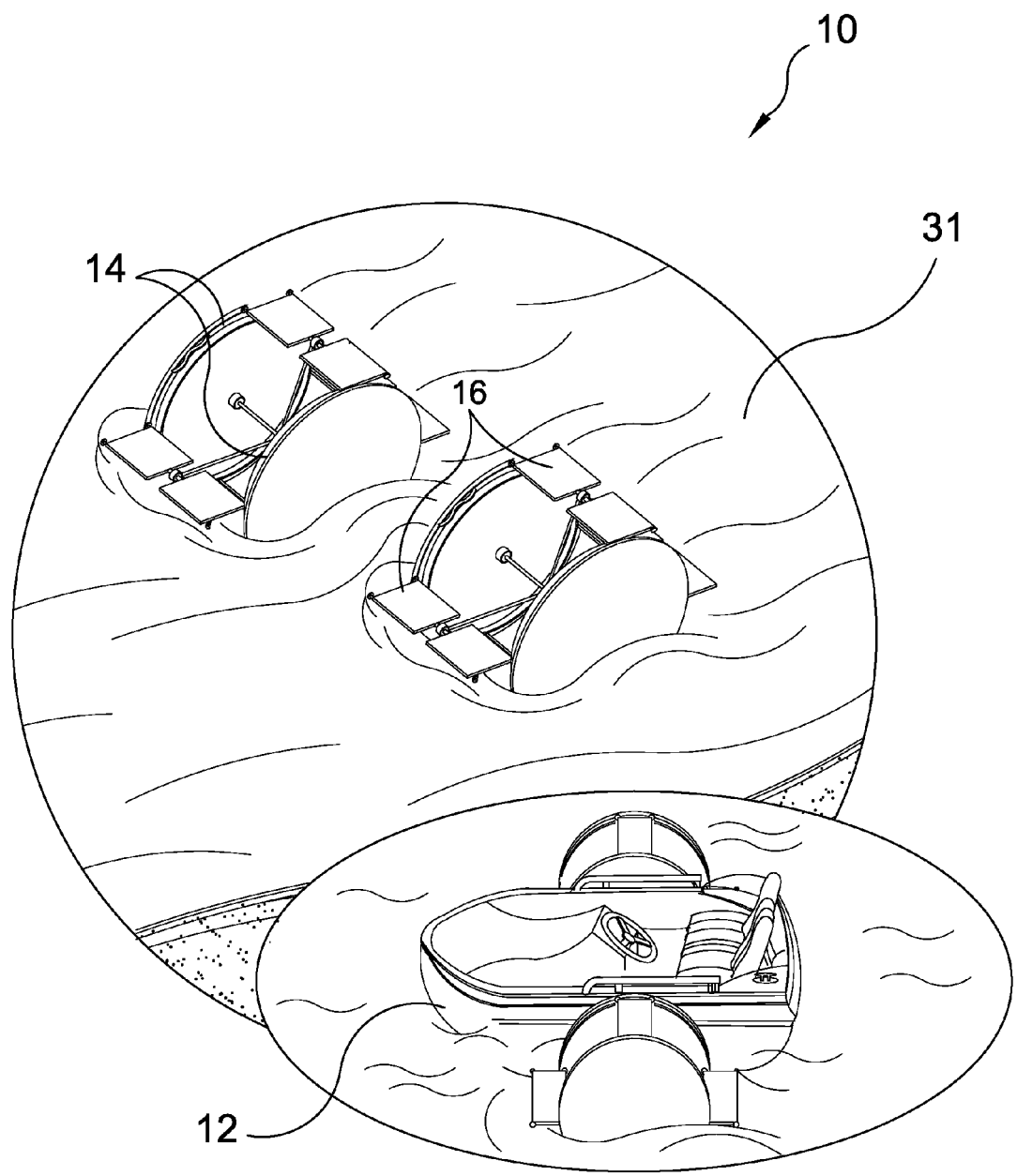
FIG. 1 is an illustrative view of the present invention's use.

Turning now descriptively to the drawings, in which similar reference characters denote similar elements throughout the several views, the figures illustrate the Water and Wind Turbine of the present invention. With regard to the reference numerals used, the following numbering is used throughout the various drawing figures.

10 Water and Wind Turbine of the present invention
12 watercraft
14 stationary plate
16 fin
18 main central shaft
20 arm
22 power transfer
24 pivot bearing
26 channel
28 roller bearing
29 fluid movement
30 wind
32 water
34 lead roller bearing
36 free trailer bearing
38 fin shaft
40 generator
42 inboard side of 14
44 outboard side of 14
46 pivot transfer switch
48 rotation of 16
50 excessive force
52 restrainer
54 pivot point of 16

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

FIG. 1 is an illustrative view of the present invention 10 in use. Shown is the present invention 10 being a pair of spaced apart stationary plates 14 having a plurality of fins 16 disposed therebetween angularly disposed into optimum positioning for maximum driving and power production therefrom. Additionally, the present invention 10 may be utilized as an air driven turbine or as a water 31 driven wheel as depicted. In a reversed and powered scenario the present invention 10 may also be utilized as a propulsion means for watercraft 12.

Figure 2:
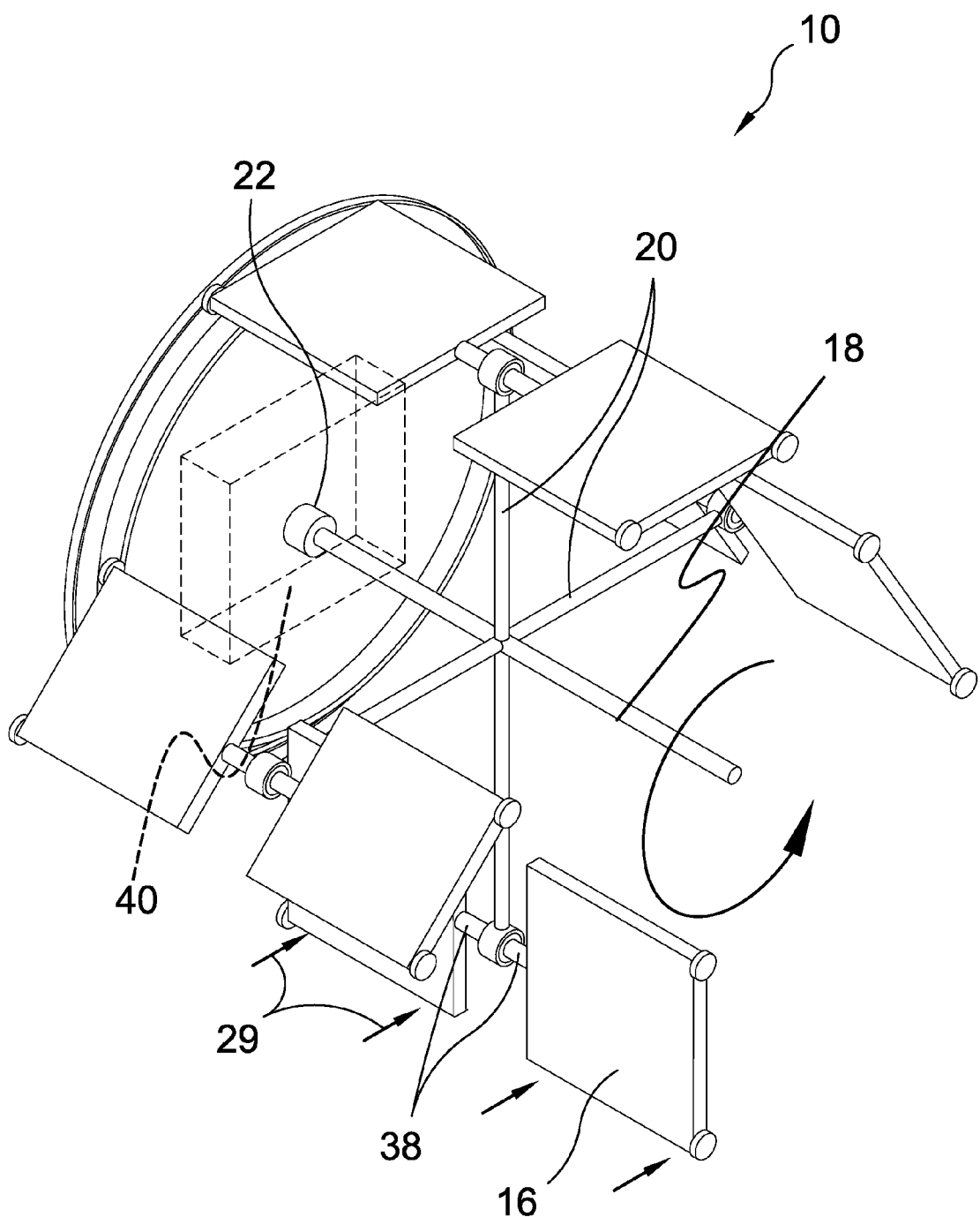
FIG. 2 is a front perspective view of the present invention in use with a fluid.

FIG. 2 is a front perspective view of the present invention 10 in use with a fluid. The present invention 10 is a turbine powered by a moving fluid 29, such as wind or water, turning a central shaft 18 having pairs of radially positioned arms 20 with each having a fin shaft 38 with a pair of fins 16 pivotally attached thereto. The fins 16 are independently movable one from the other whereby one is driven in a vertical plane while the opposed fin 16 is driven in a horizontal plane. Power transfer 22 is accomplished between the central shaft 18 and a generator 40 Additionally the present invention 10 may be coupled to a motor or source of torque to be manually rotated and driven in a manner that can be utilized in powering small watercraft.

Figure 3:
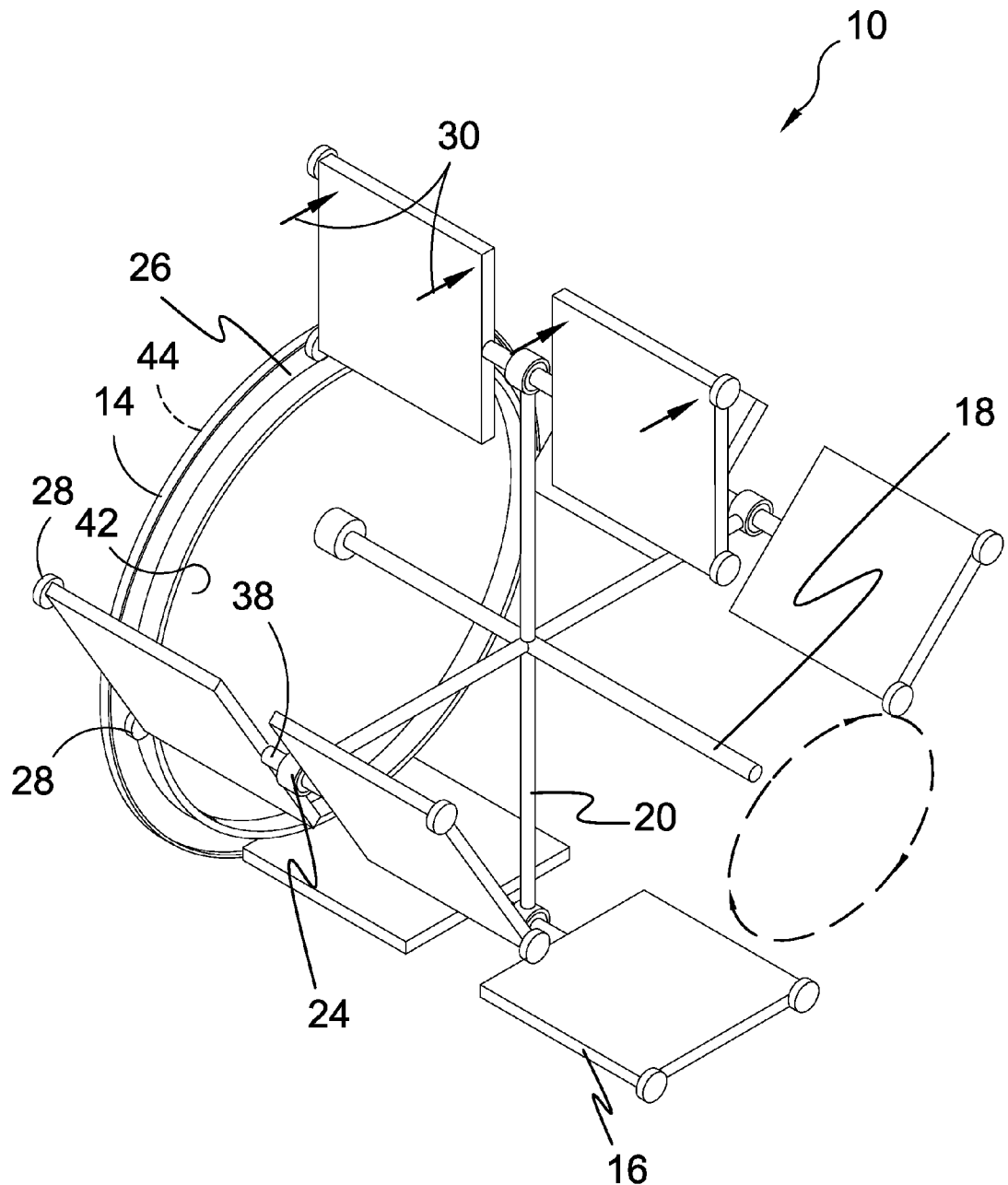
FIG. 3 is a front perspective view of the present invention in use with wind.

FIG. 3 is a front perspective view of the present invention 10 in use with wind 30. The present invention is a moving fluid powered turbine 10 having an pivot bearing 24 in rotative communication with the shafts 38 of a set of fins 16 attached to arms 20 radiating from a central, main shaft, 18 serving as an axle and disposed between two stationary plates 14, each fin 16 has a roller bearing 28 attached to the two outer corners. While one said bearing 28 runs along a circular channel 26 of a smaller diameter than that of the arm 20, the angle that each fin 16 rotates is controlled in order to transfer maximum energy to the power transfer 22 of the main shaft 18. Shown are the fins 16 being driven by the wind 30. The stationary plates 14 includes an inboard side 42 with the central shaft projecting perpendicularly therefrom and an outboard side 44.

Figure 4:
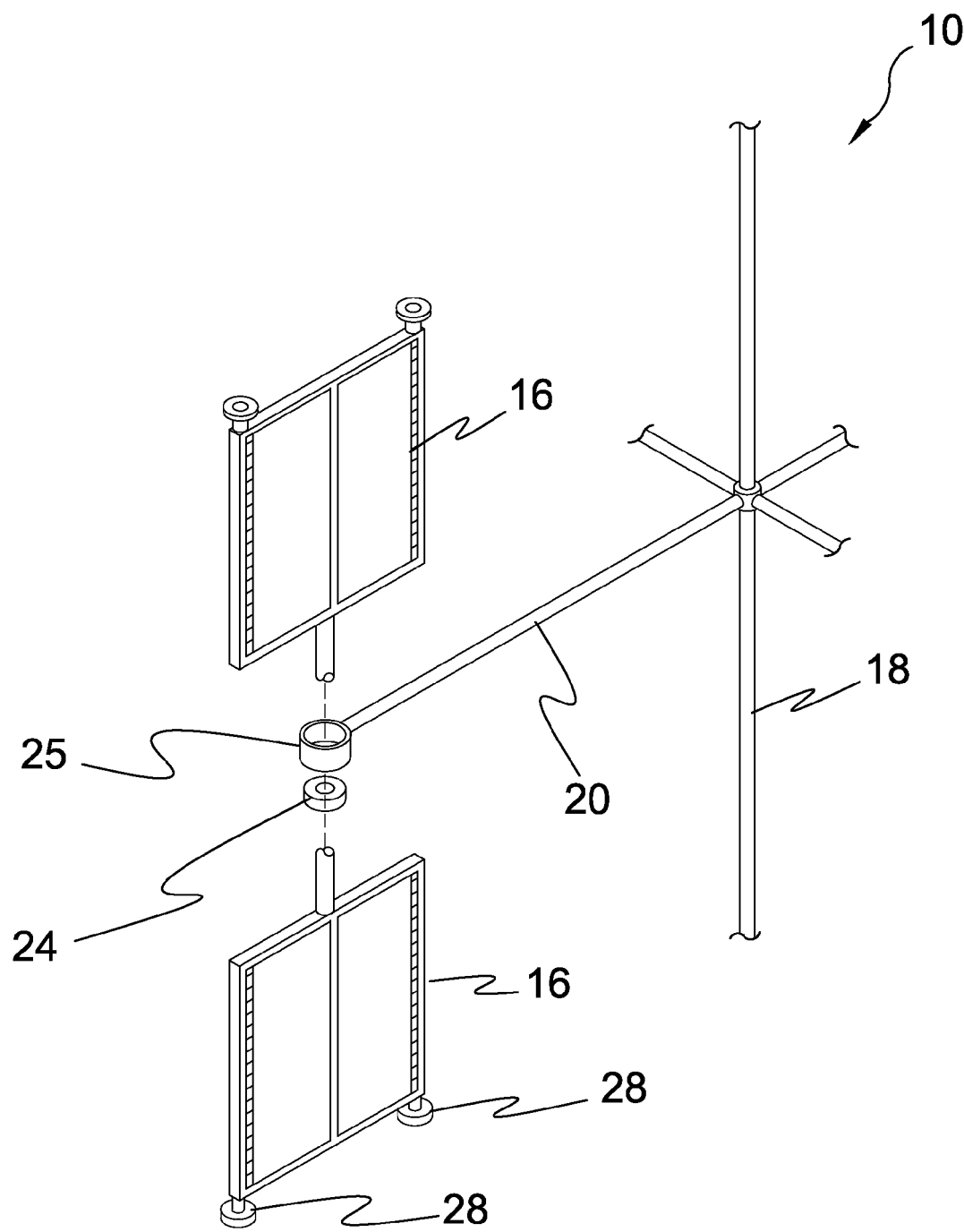
FIG. 4 is an exploded view of the present invention.

FIG. 4 is an exploded view of the present invention 10. The present invention 10 has a main shaft 18 with a plurality of support arms projecting perpendicularly therefrom with the distal end of each having a pivot bearing 24 rotatively connected to a pair of rectangular fins 16, having one on each side of the arm, which rotates. Each fin 16 has a roller bearing 28 attached its two outer corners. While one said bearing 28 runs along a channel in a circular track of a smaller diameter than that of the arm, the angle that each fin 16 rotates is controlled, in order to transfer maximum energy to the main shaft 18.

Figure 5:
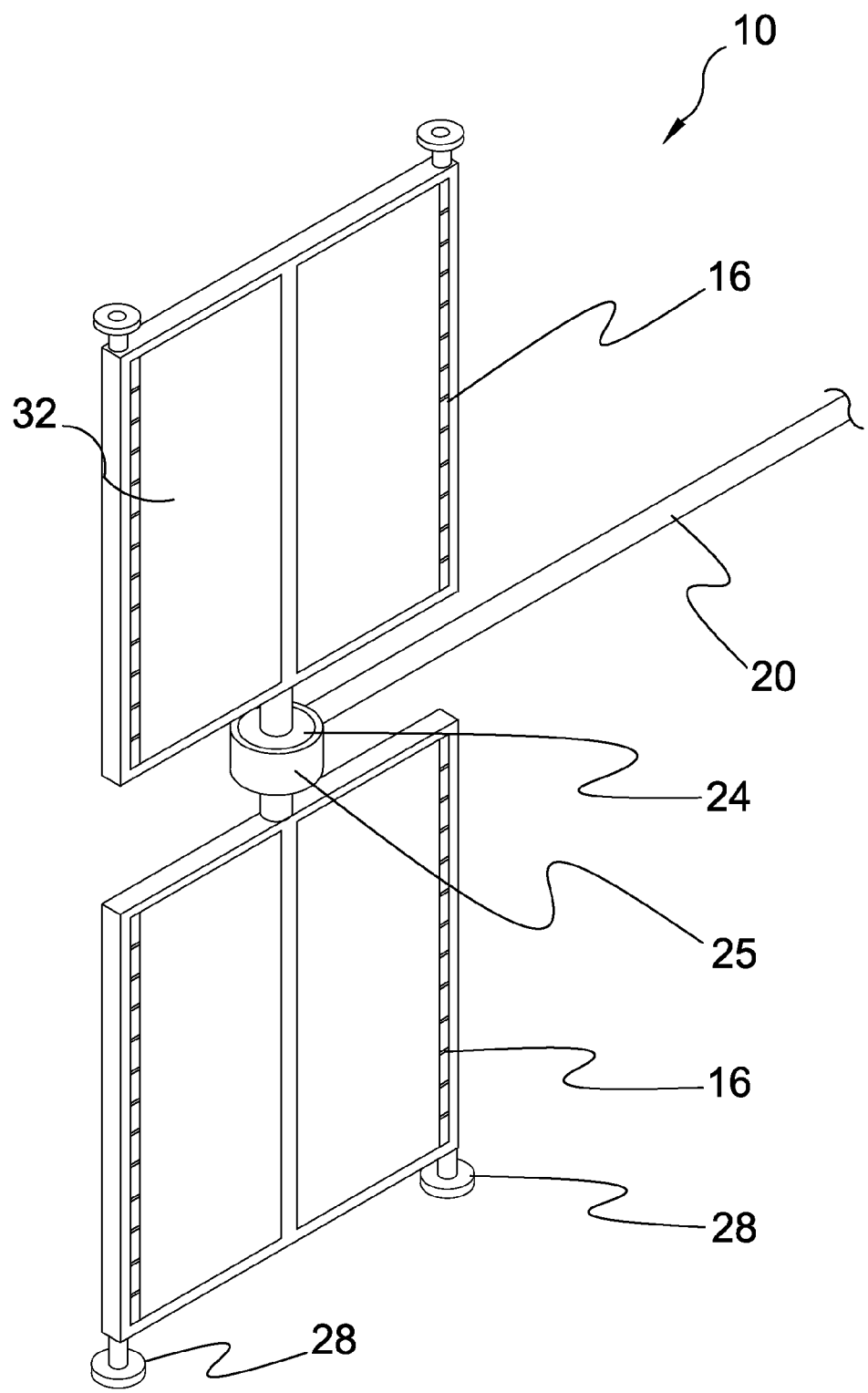
FIG. 5 is a detail view of the present invention.

FIG. 5 is a detail view of the present invention 10. Shown is a detail view of the fin 16, arm 20 and roller bearings 28 of the present invention 10. This wind or water powered wheel provides pairs of radially positioned arms 20 with each having a shaft with a pair of fins 16 pivotally attached thereto via a pivot bearing 24 in a pivot bearing housing 25. The fins 16 are independently movable from the other whereby one is driven in a vertical plane while the opposed fin 16 is driven in a horizontal plane. Additionally shown is the present invention having a pressure release gate 32 whereby under the incident of extreme weather, release is caused, to permit flow that otherwise would destroy the fin if opposed.

Figure 6:
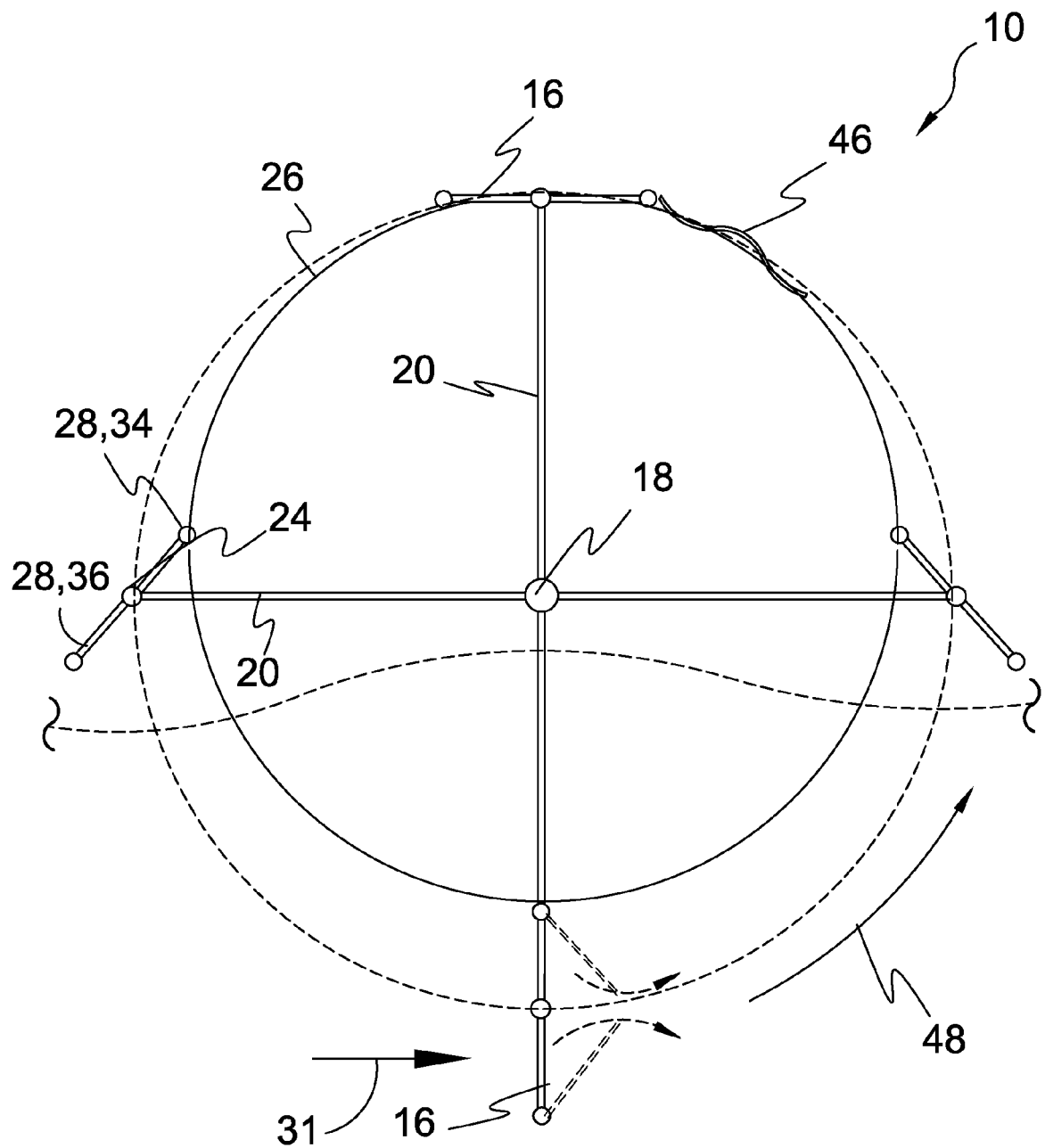
FIG. 6 is a side view of the present invention operating in water.

FIG. 6 is a side view of the present invention operating in water 31. The present invention 10 has a central shaft 18 with perpendicularly extending arm 20 having a pivot bearing 24 that supports the rectangular fins 16 having one fin 16 on each side of the arm 20, which rotates. Each fin 16 has a roller bearing 28 attached to the two outer corners. While one runs along a circular channel 26, which is of a smaller diameter than that of the arm 20, dictates the angle of each fin 16 as it rotates 16 to transfer maximum energy to the main shaft 18. A pivot switch 46 alternates the positions of the roller bearings 28 so the lead bearing 34 traveling within the channel 26 becomes the free trailing bearing 36.

Figure 7:
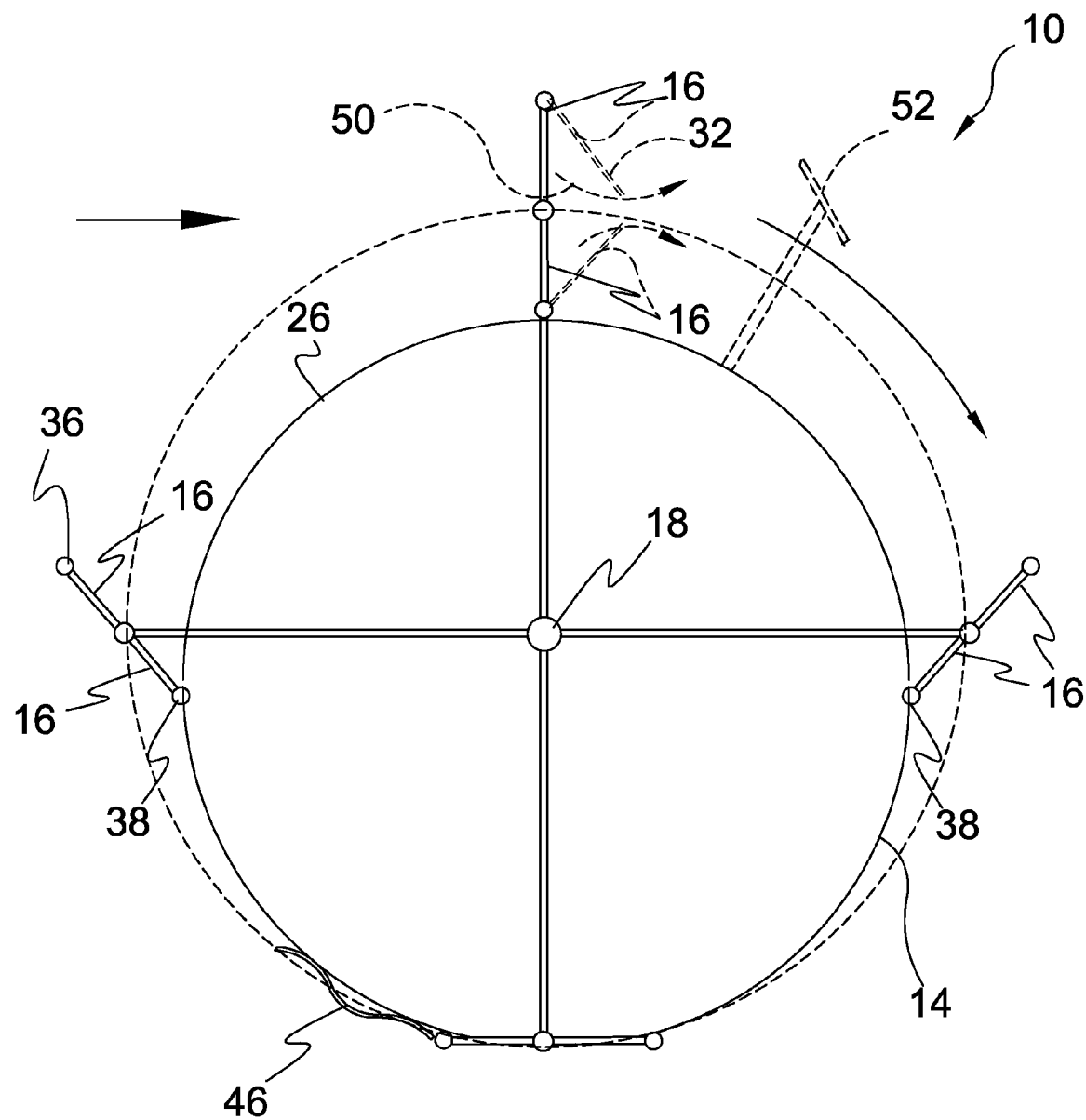
FIG. 7 is a side view of the present invention operating in the wind.

FIG. 7 is a side view of the present invention 10 operating in the wind 30. The main central shaft 18 is slightly offset from the center of the stationary plates 14 and a pivot transfer switch 46 forces the lead roller bearing 34 from the channel 26 and transfers the free trailing bearing 36 into the lead roller bearing 34. A pressure release gate 32 integral with each fin 16 responds to excessive force 50 by opening to relieve the pressure and prevent damage to the apparatus. Also shown is the restrainer 52.

Figure 8:
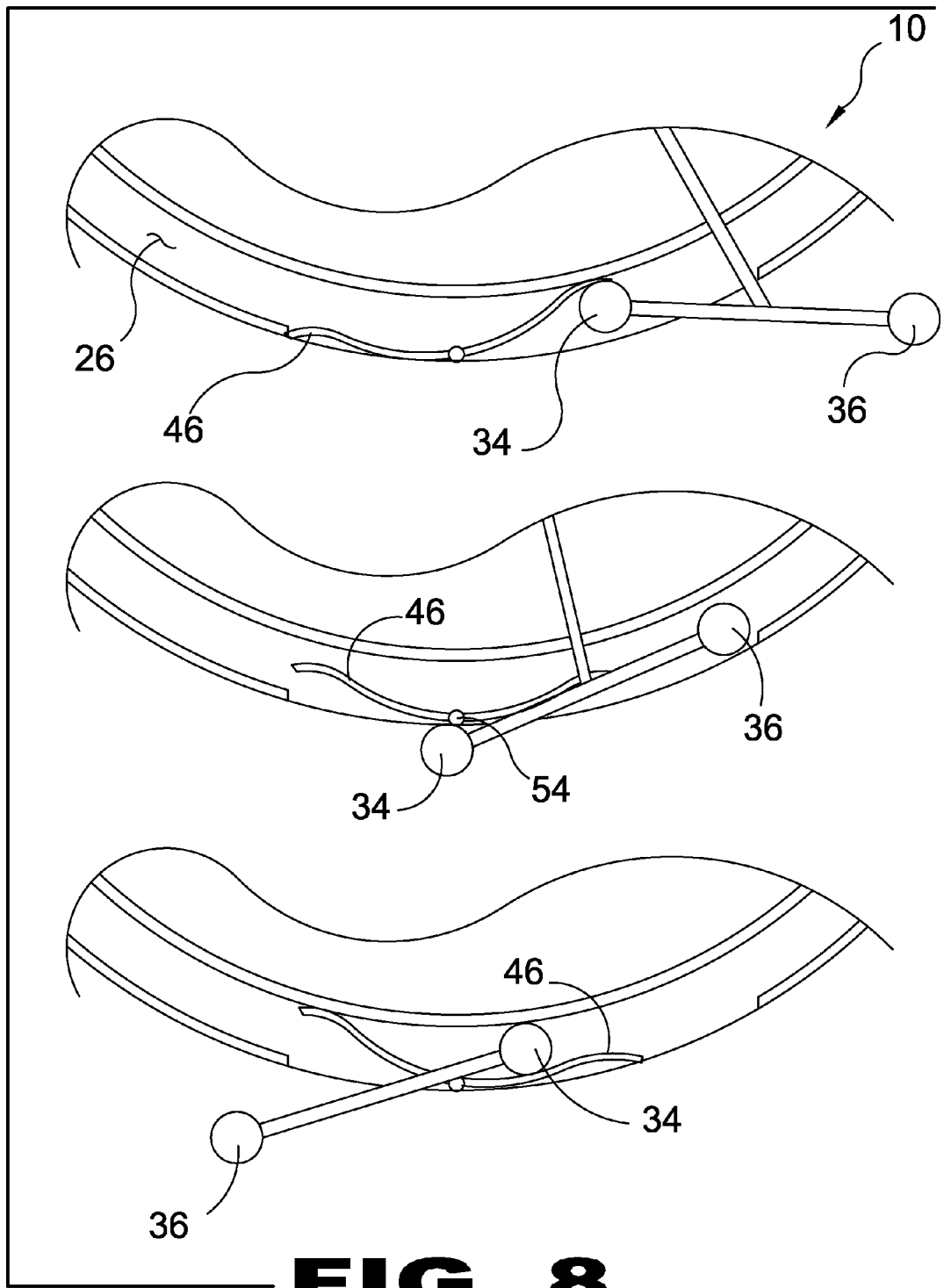
FIG. 8 is a detailed progression view of the present invention's transfer switch.

FIG. 8 is a detailed progression view of the present invention's 10 pivot transfer switch 46. Depicted below is the transfer switch 46 with a pivot point 54 that forces the lead roller bearing 34 out of channel 26 and thus becoming a free trailer bearing 36. Upon continued rotation the pivot transfer switch 46 pivots upon an anchor point that provides means for the trailing or free bearing 36 to enter the channel 26 and thus becoming the lead bearing 34.

Figure 9:
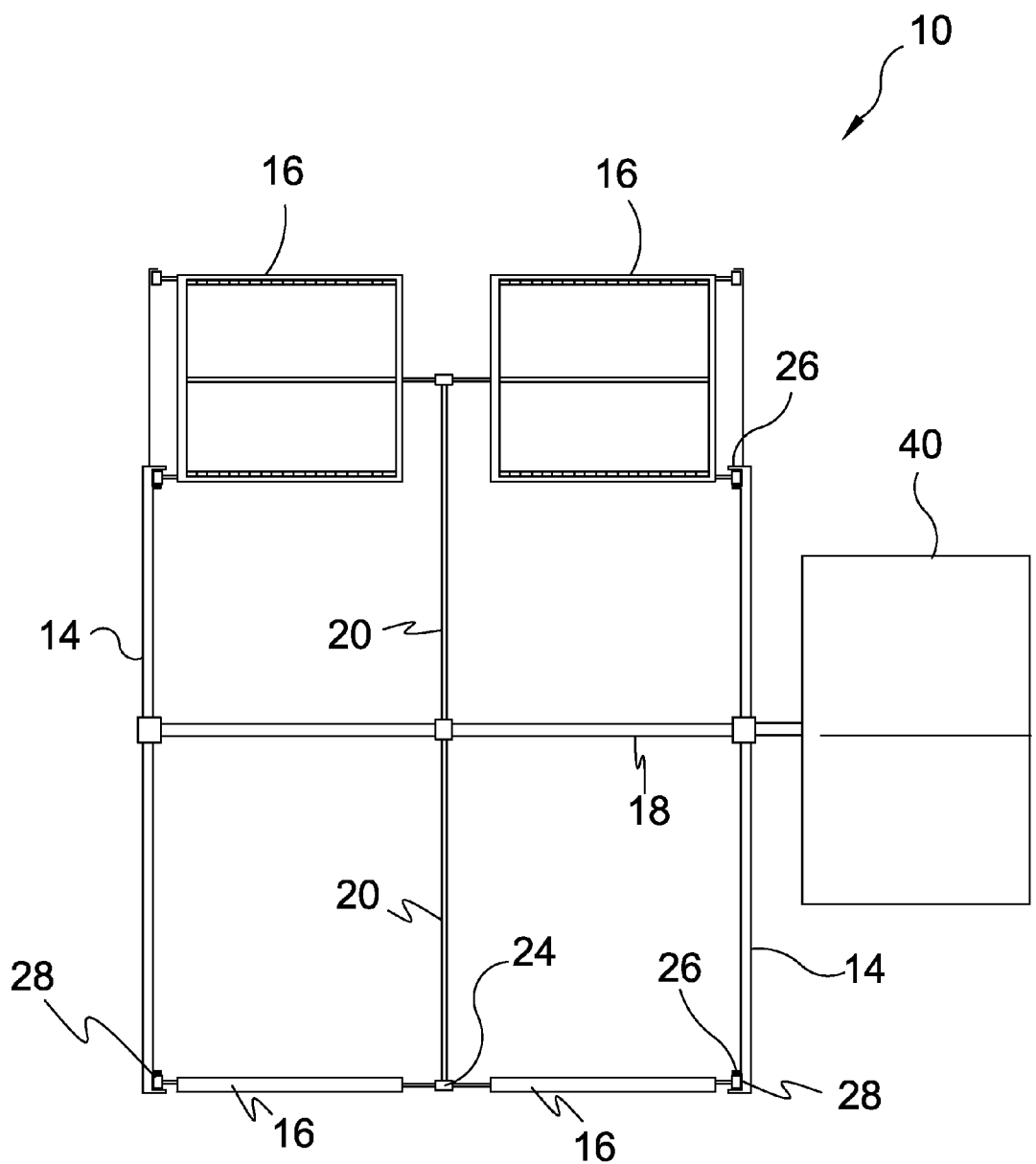
FIG. 9 is a front view of an additional element of the present invention.

FIG. 9 is a front view of an additional element of the present invention 10. The wind/water turbine of the present invention 10 provides a pair of spaced apart stationary plates 14 with guide channels 26 having at least one pair of radially positioned fins 16 situated approximately 90 degrees one from the other. Each pair of fins 16 has roller bearings 28 positioned on its top and bottom distal ends and are pivotally fixed to an arm 20 connecting to a central shaft 18 in communication with a power conversion generator 40 that converts the mechanical energy from wind or water that pushes the fins 16 into electrical current. The fins 16 rotate within pivot bearings 24 to optimize harvesting of potential energy while reducing drag.

Figure 10:
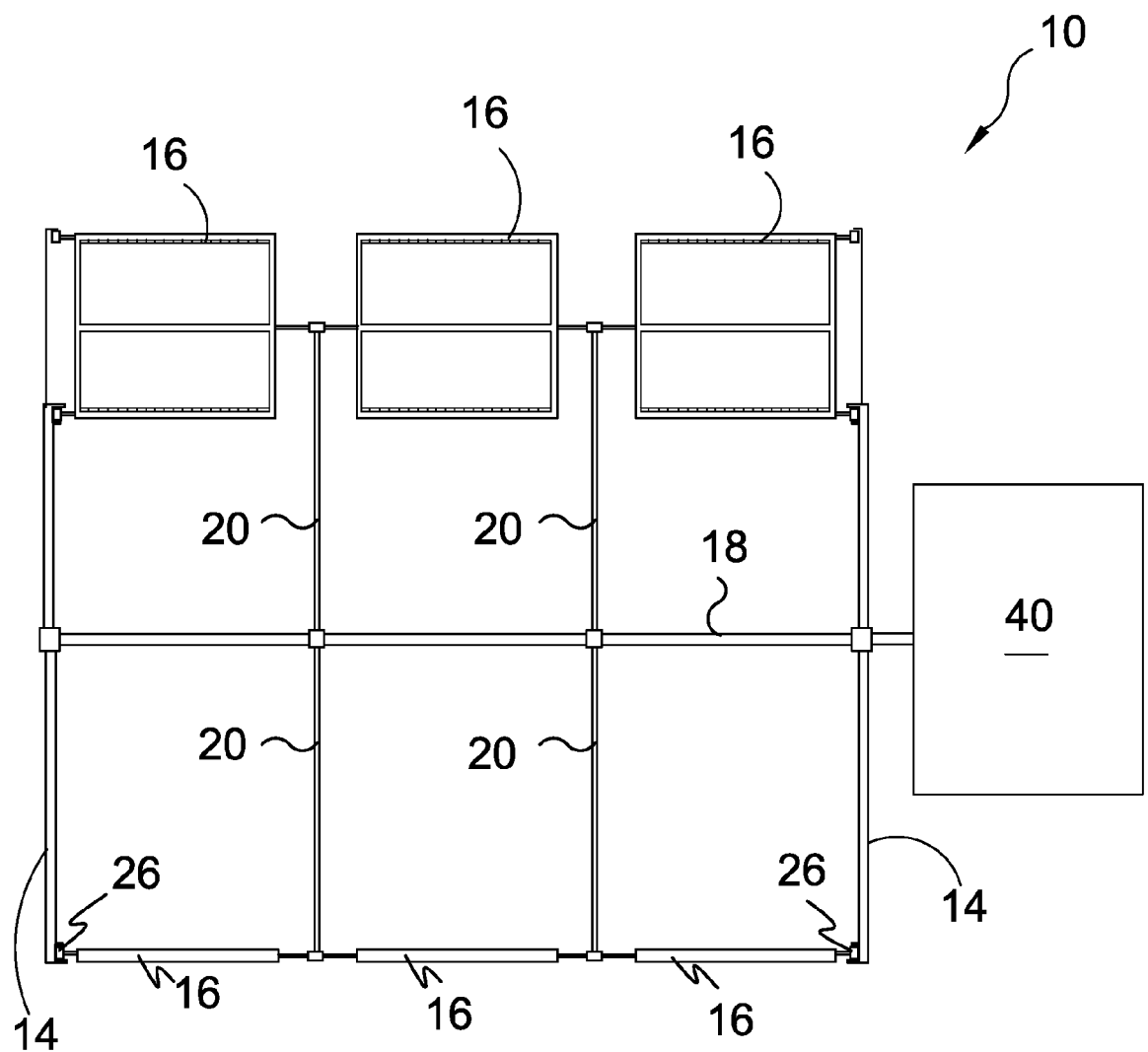
FIG. 10 is a front view of an additional element of the present invention.

FIG. 10 is a front view of an additional element of the present invention 10. The present invention 10 may be expanded and ganged with a plurality of fins 16 and arms 20 operating on a common main shaft 18 and generator 40 as the roller bearings 28 travel through the channels 26 of the stationary plates 14.

Figure 11:
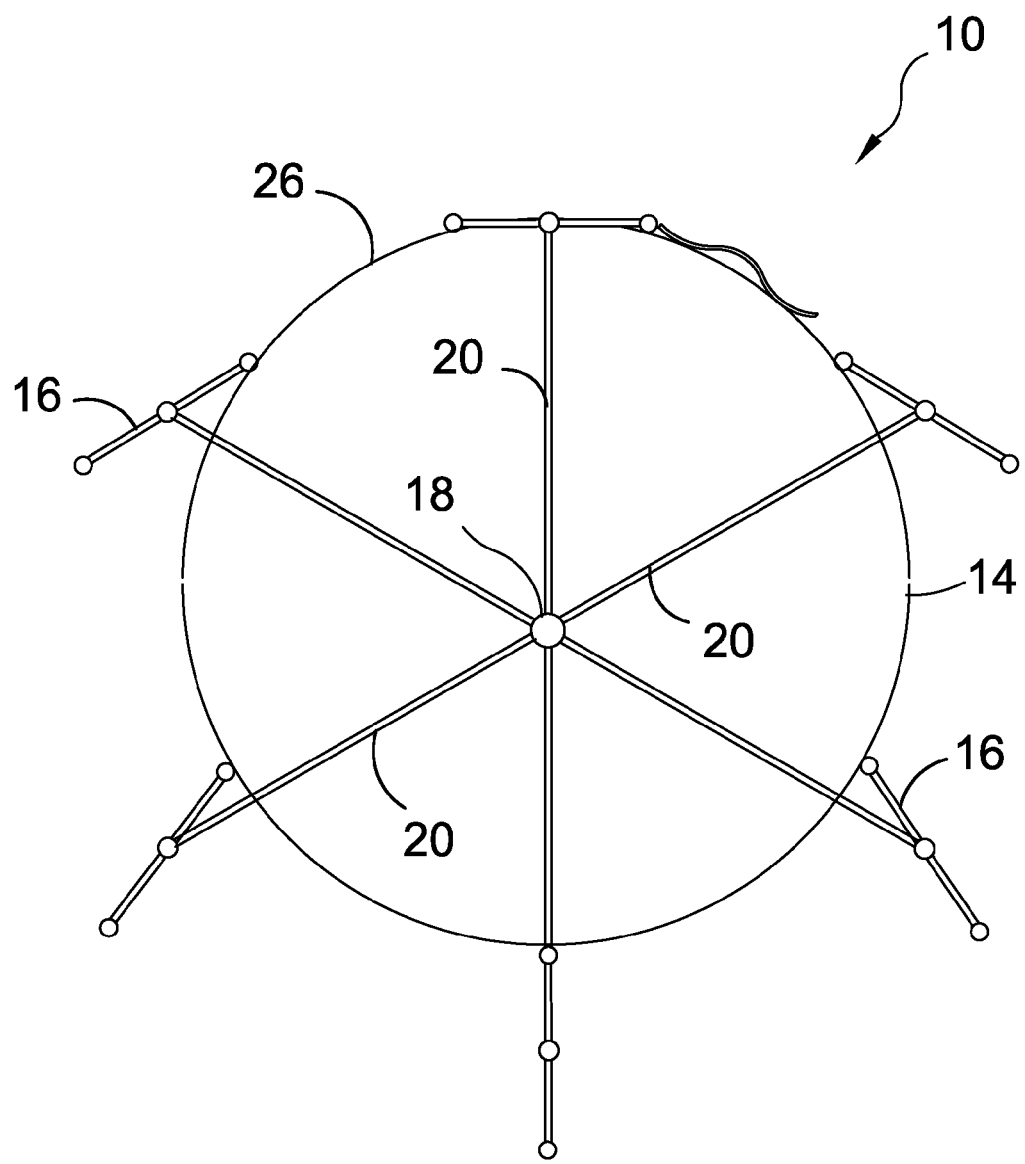
FIG. 11 is a side view of the present invention having additional arms.

FIG. 11 is a side view of the present invention 10 having additional arms 20. Shown is the present invention 10 being utilized as a water driven turbine whereby the disposition of the fins 16 are switched from top to bottom in the channel 26. The changed angular juxtaposition allows the fins 16 of stationary plates 14 to be placed in maximum positioning for harnessing said water's flow and transferring the potential energy from the main shaft 18 to the generator. Additionally the present invention 10 may be operated in flows directed in either direction allowing it to function in reciprocating currents.

Figure 12:
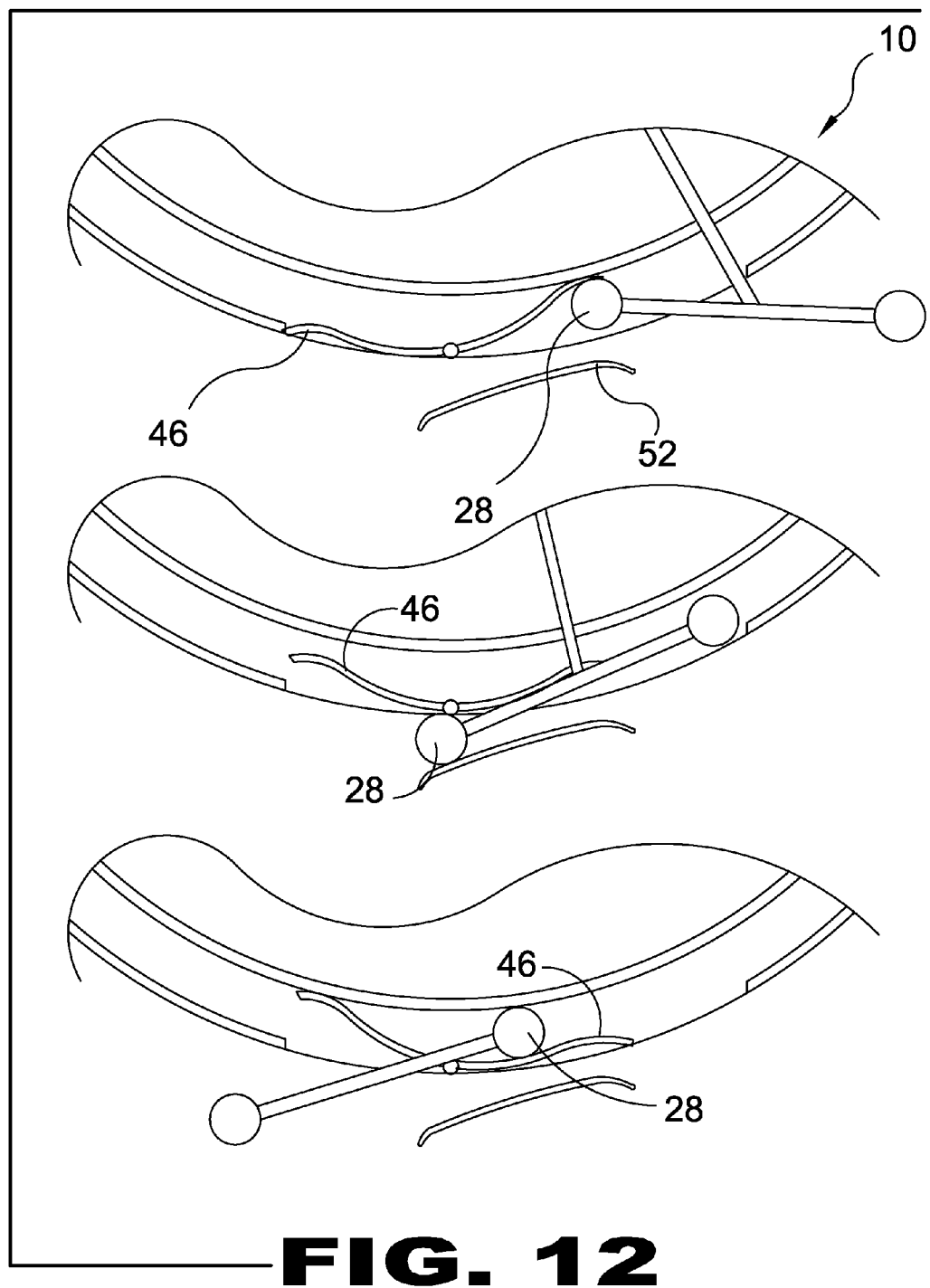
FIG. 12 is a detailed view of an additional element of the present invention.

FIG. 12 is a detailed view of an additional element of the present invention 10. Shown is the present invention 10 having an additional element being a retaining rail 52 that is utilized in guiding the bearings 28 as they pass through the pivot transfer switch 46 during reverse rotation.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A turbine powered by a moving fluid, the turbine comprising:
    spaced apart plates having a track extending along a peripheral portion of at least one plate;
    an axle rotatably connected to the plates, the axle positioned off-center from an axis of rotation defining the circular track;
    a plurality of arms radially extending from the axle from proximal ends outwardly to distal ends thereof;
    a fin rotatably attached to each of the plurality of arms at the distal ends thereof for rotation about a fin axis, wherein each fin is operably guided by the track at a location offset the fin axis.

2. A turbine according to claim 1, wherein the track comprises a circular track extending along an interior side of the at least one plate.

3. A turbine according to claim 1, wherein the fin is slidably connected to the track.

4. A turbine according to claim 1, further comprising:
    a pivot switch operable with the track: and
    spaced apart bearings positioned on each of the spaced apart plates, wherein a lead bearing travels within the track until impacting the pivot switch whereupon the pivot switch rotates the fin resulting in a trailing bearing to be guided by the track while the lead bearing now travels exterior to the track.

5. A turbine according to claim 1, wherein the plurality off arms comprises pairs of oppositely disposed arms connected generally perpendicular to the axle.

6. A turbine according to claim 1, further comprising a generator operable with the axle for converting mechanical energy transferred thereto into electrical energy.

7. A turbine powered by a moving fluid comprising:
    a) spaced apart stationary plates with a peripherally positioned track on the interior sides of the plates having a gap in the exterior track wall with a pivot switch fixed therein;
    b) a rotative axle extending between said stationary plates and positioned off-center of said plates;
    c) the axle having radially extending arms terminating in a bearing;
    d) shafts positioned within the arm bearings having at least two fins fixedly attached thereto;
    e) the at least two fins having exterior sides in proximity to the stationary plates with a pair of spaced apart fin bearings positioned on each exterior side with one of the bearings continuously traveling within the stationary plate track while the other travels exteriorly to the track.

8. A turbine powered by a moving fluid according to claim 7, wherein the fin-bearings comprise a lead bearing and a trailing bearing wherein the lead-bearing travels within the stationary track until impacting the pivot switch whereupon the lead-bearing rides along the pivot switch to the pivot switch pivot point causing the pivot switch to pivot wherethen the trailing-bearing is guided into the stationary track impacting and returning the pivot switch to its starting point while the lead-bearing now travels exterior to the track.

9. A turbine powered by a moving fluid according to claim 7, further comprising a plurality of additional pairs of oppositely disposed arms connected at one end, at right angles, to said main shaft, said plurality of additional pairs of oppositely disposed arms evenly spaced from said first pair of oppositely disposed arms and from each other.

10. A turbine powered by a moving fluid according to claim 8, further comprising a pivot bearing housing surrounding and housing said pivot bearing.

11. A turbine powered by a moving fluid according to claim 10, further comprising a pressure release gate for releasing said fin when subjected to a flow stronger than a predetermined maximum intensity.

12. A turbine powered by a moving fluid according to claim 10, further comprising a retaining rail that guides said bearings in said channels during reverse rotation.

13. A turbine powered by a moving fluid according to claim 11, further comprising a retaining rail that guides said bearings in said channels during reverse rotation.

14. A turbine powered by a moving fluid according to claim 7, further comprising means for fixing said stationary plates.

15. A turbine powered by a moving fluid according to claim 7, further comprising means for converting mechanical energy transferred to said turbine by said current of water turning said fins into electrical energy.

16. A turbine powered by a moving fluid according to claim 15, wherein the means for converting mechanical energy into electrical energy comprises a generator.

17. A turbine powered by a moving fluid according to claim 8, wherein each said pair of roller bearings extends from a corner of said distal free side of each of said fin.

18. A turbine powered by a moving fluid according to claim 8, further comprising a source of torque for rotating said main shaft.

19. A turbine powered by a moving fluid according to claim 18, wherein said source of torque is a motor.

20. A turbine powered by a moving fluid according to claim 1, further comprising a small watercraft driven by said turbine.

* * * * *